United States Patent Office 2,790,010
Patented Apr. 23, 1957

2,790,010

SYNTHESIS OF META-SUBSTITUTED PHENOLS

Alvin F. Shepard, Le Roy, N. Y., assignor to Hooker Electrochemical Company, Niagara Falls, N. Y., a corporation of New York No Drawing. Application December 18, 1952, Serial No. 326,783

2 Claims. (Cl. 260—626)

This invention relates to a new method of synthesizing meta-substituted phenols and to the new and useful compounds produced in and by this synthesis. More particularly, this invention relates to the new and useful meta-alkylated phenol, 3,5-diisopropyl phenol; a method for synthesizing the new and useful meta-alkylated phenol, 3,5-diisopropyl phenol, as well as 5-isopropyl resorcinol and phloroglucinol; and the new and useful intermediates produced in and by this synthesis.

The term "meta-alkylated phenol" as used in the present specification and claims means a phenol having an alkyl substituent in the 3- or 5-positions or both positions.

Direct alkylation of phenol, depending on the degree of alkylation, produces ortho- and para-alkylated phenols or a 2,4-dialkylated phenol. Inability to produce a meta-alkylated phenol by direct alkylation of phenol is thought to be due to the fact that the hydroxyl group attached to the benzene ring acts as an electron donor group which directs substituents to the ortho- and para-positions in the ring rather than the meta positions. See, for example, "Organic Chemistry" by R. Q. Brewster, Prentice-Hall Inc., New York, N. Y. (1948), pages 489–491.

Although, therefore, it is a relatively simple matter to prepare mixtures of ortho- and para-alkylated phenols by direct alkylation of phenol and to separate them by taking advantage of the greater volatility of the ortho-compound and the higher melting point of the para-compound, preparation of meta-alkylated phenols must be by other methods.

The syntheses developed by the prior art for producing meta-alkylated phenols are difficult, to say the least, because of the many intermediate compounds which must be synthesized in order to arrive at the desired meta-alkylated phenol. For example, the preparation of meta-isopropyl phenol in accordance with Behal and Tiffeneau in Bull. Soc. Chim. [4] 3, 316–317 as recorded in Beilstein may be outlined as follows:

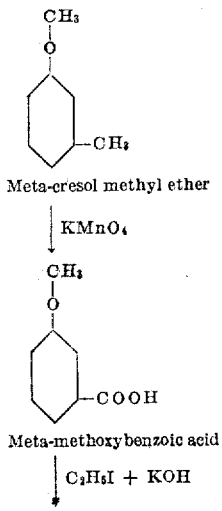

Meta-cresol methyl ether

| KMnO₄

Meta-methoxybenzoic acid

| C₂H₅I + KOH

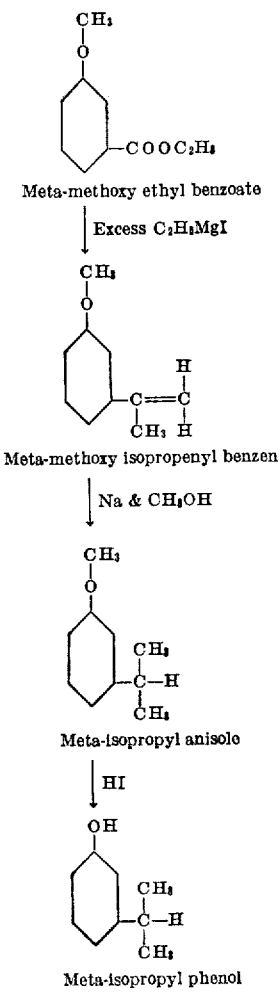

Meta-methoxy ethyl benzoate

| Excess C₂H₅MgI

Meta-methoxy isopropenyl benzene

| Na & CH₃OH

Meta-isopropyl anisole

| HI

Meta-isopropyl phenol

Those skilled in the art will recognize the difficulties involved in a synthesis necessitating the production of so many intermediate compounds. Provision of a practical and economically feasible method of synthesizing meta-substituted phenols has been needed in the art.

Accordingly, it is a principal object of the present invention to provide a new method of synthesizing meta-substituted phenols which method utilizes easily obtained initial reactants and requires the synthesis of a minimum number of intermediate reaction products.

A further object of the present invention is to provide a process which is particularly applicable to the preparation of the new and useful meta-alkylated phenol, 3,5-diisopropyl phenol as well as the preparation of 5-isopropyl resorcinol and phloroglucinol.

Another object of the present invention is to synthesize the new and useful meta-alkylated phenol, 3,5-diisopropyl phenol.

An additional object of the present invention is to synthesize new and useful intermediate compounds during the synthesis of the aforesaid meta-substituted phenols.

These and other objects and advantages will become more apparent during the following description.

I have discovered that a 1,3,5-trialkylated benzene provides a convenient initial reactant for synthesizing a 3,5-dialkylated phenol and a 5-alkylated resorcinol, as well as the known compound phloroglucinol. A variety of 1,3,5-trialkylated benzenes may be made, as is known in the art, by alkylation of benzene in the presence of aluminum chloride. By my newly discovered synthesis, only one intermediate class of compounds need be formed and this class of compounds includes new and useful compounds. Reaction conditions of this synthesis may be easily controlled to favor the final yield of one meta-alkylated phenol in preference to the other. The percentage yield of the desired end-product is exceptionally good from a commercial standpoint.

Although the following specific description of my invention employs 1,3,5-triisopropyl benzene as the initial reactant and discusses the synthesis of the meta-alkylated phenols, 3,5,-diisopropyl phenol and 5-isopropyl resorcinol, as well as phloroglucinol, the method may be applied to other 1,3,5-tri-substituted benzenes, such as 1,3,5-triethyl benzene, 3,5-diisopropyl toluene, 1,3,5-tri-secondary butyl benzene, 1,3,5-tri-n-amyl benzene, 1,3,5-tricyclopentyl benzene, 1,3,5-tricyclohexyl benzene, 3,5-dichloro-cumene, etc.

In accordance with my invention 1,3,5-triisopropyl benzene is first oxidized to produce a mixture of hydroperoxides which may be represented structurally as follows:

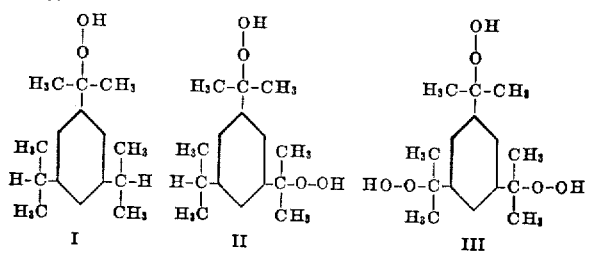

The oxidation of 1,3,5-triisopropyl benzene may be carried out under a variety of conditions of pressure and temperature. At atmospheric pressure, it can be carried out from below room temperature to the boiling point of 1,3,5-triisopropyl benzene, which is approximately 235° C. At elevated pressures, a higher temperature range may be employed. An optimum temperature range exists for each selected condition of pressure. For atmospheric pressure, for instance, the range from 100 to 200° C. is most suitable. In this range, the ratio of formation of the hydroperoxide to the decomposition of the hydroperoxide already formed is most favorable. In order to maintain the selected temperature, the heat generated in this exothermic reaction should be removed by suitable means.

As in all cases in which the primary product of reaction is subjected to the further action of the reagent, exemplified here by the oxidation of the mono-hydroperoxide to the di-hydroperoxide and of the latter to the tri-hydroperoxide, the final concentration of the different reaction products in any given reaction mixture is a function of the degree of conversion of that mixture and can be calculated from the law of mass action.

The calculation for the analogous case referring to the chlorination of benzene was treated by MacMullin in Chemical Engineering Progress 44, 183 (1948). Consequently, it is desirable to select the degree of conversion of any given mixture according to the desired end product. If the latter is the mono-hydroperoxide, a low conversion of up to 30% (calculated as the mono-hydroperoxide), for instance, is preferred, while for a production of di- and tri-hydroperoxide conversions of, for instance, 60 to 80% and at least 80% respectively (calculated as the mono-hydroperoxide) are preferred.

If the goal of the production is the 1,3,5-triisopropyl benzene mono-hydroperoxide, it is, in conformity with the previous statement, desirable to interrupt the oxidation at a comparatively low value of, for instance, 20–30% hydroperoxide content calculated as the mono-hydroperoxide. After removing the unchanged hydrocarbon, the residue contains a few percent of di- and a trace of tri-hydroperoxide, and can be considered for most practical purposes as essentially pure mono-hydroperoxide. If the production of an entirely pure mono-hydroperoxide is desirable, this compound can be isolated either by fractional distillation of this residue or by precipitating the higher hydroperoxides in the form of their sodium or other suitable salts.

The isolation of the di- and tri-hydroperoxide may be accomplished by similar methods. The preferred method, however, is to crystallize them from reaction mixtures oxidized to conversions of more than 50% by cooling. When subjected to low temperatures such as 10 to −10° C., crystals of di- and tri-hydroperoxide are precipitated and can be separated from the mother liquor by filtration or other methods. The separation of the di- from the tri-hydroperoxide can be achieved by extraction, by recrystallization or similar means.

Oxidation of 1,3,5-triisopropyl benzene to form the above hydroperoxides proceeds in the absence of an added catalyst. However, the formation of 1,3,5-triisopropyl benzene hydroperoxides is accelerated by the presence of such catalysts as sodium hydroxide, potassium hydroxide, calcium hydroxide, pyridine, tribenzylamine, iron stearate, copper acetate, hexa-pyridine cobaltic chloride, etc.

In the oxidation of 1,3,5-triisopropyl benzene, as in the oxidation of other hydrocarbons, an induction period is frequently observed in which the initial rate of oxygen consumption is slow. In order to overcome this induction period, it was found advantageous to add a minor proportion of 1,3,5-triisopropyl benzene hydroperoxide to the hydrocarbon to be oxidized or vice versa.

The preferred method of operation then consists of blowing oxygen, or oxygen-containing gases such as air, through a mixture prepared from 1,3,5-triisopropyl benzene, a minor portion of 1,3,5-triisopropyl benzene hydroperoxide and a catalyst.

With increasing conversion, the net gain of hydroperoxide in a given time decreases due to the decreasing concentration of unoxidized material and to the increased rate of decomposition of hydroperoxide already formed. It is therefore normally advisable to interrupt the oxidation after a conversion of 70 to 90% of the hydrocarbon has been reached, although under suitable conditions a much higher conversion can be achieved and may be desirable.

The next and final step of my process is the cleavage or ketonic decomposition of any one of the three hydroperoxides or a mixture thereof to form meta-substituted phenols.

Theoretically this cleavage proceeds as follows:

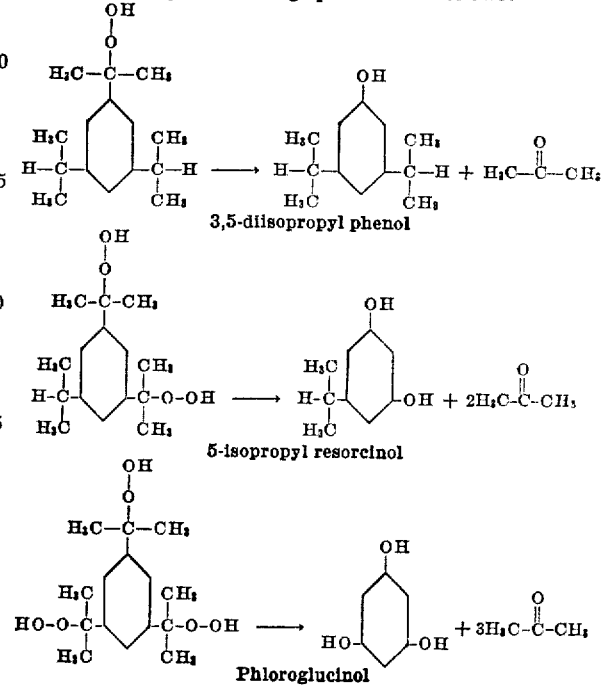

The exact mechanism of this cleavage reaction is not understood. However, it involves a ketonic decomposition and will occur when the 1,3,5-triisopropyl benzene hydroperoxides are treated with acidic substances or heat or ultra-violet light or other ketonic decomposition promoters. By an acidic substance is meant a substance which gives an acid reaction in water. It is not, however, necessary that these acidic substances be dissolved in water since cleavage or ketonic decomposition is promoted by organic sulfonic acids, ferric chloride, perchloric acid, sulfuric acid, phosphoric acid, hydrochloric acid, hydrogen chloride, trichloro-acetic acid, etc.

A variety of techniques are available for accomplishing ketonic decomposition of the hydroperoxides of 1,3,5-triisopropyl benzene. For example, the hydroperoxide solution may be added dropwise to an acid cleavage agent dissolved in water such as 10 to 20% sulphuric acid or added dropwise to concentrated hydrochloric acid, etc. The hydroperoxide solution may be added to a cleavage agent dissolved in hydrocarbons, such as a 1 to 3% p-toluene sulfonic acid solution in toluene or it may be added to an acid cleavage agent dissolved in other acids such as a 2% solution of perchloric acid in glacial acetic acid.

On the other hand, the cleavage agents as such or in solution can be added to the reaction mixture. A good cleavage for instance is obtained by adding 10% of trichloro-acetic acid to the hydroperoxidized 1,3,5-triisopropyl benzene.

The acetone theoretically formed in the cleavage reaction can be recovered by several methods. Where the cleavage is carried out by slowly adding the hydroperoxidized 1,3,5-triisopropyl benzene to a dilute aqueous acid, it is advantageous to select the temperature and pressure conditions so that the acetone distills out of the reaction mixture as it is formed in the cleavage. Where the cleavage is carried out by adding the acid cleavage agent to the hydroperoxidized 1,3,5-triisopropyl benzene solution, the acetone can be recovered by distillation after the reaction is finished. Under certain circumstances, no acetone is liberated as such, but other products appear in its stead. If the cleavage is carried out in the presence of sulfur dioxide, for instance, the acetone would appear in the form of hydroxypropane sulfonic acid.

The recovery of the phenols formed in the reaction can be achieved by any of the conventional methods. They can, for instance, be converted to their sodium salts by the addition of sodium hydroxide and can then be extracted by means of water, forming a solution of the corresponding sodium phenolates from which the phenols can be recovered by conventional means. Another way of recovering the phenols from the reaction mixture is to separate the reaction mixture, if necessary after neutralizing or removing by other means the acidic cleavage agent, by fractional distillation. Other means of recovering the phenols from the reaction mixtures will suggest themselves to those skilled in the art, according to the circumstances.

The 1,3,5-triisopropyl benzene hydroperoxides as described above are useful as intermediates for producing the new compound 3,5-diisopropyl phenol, as well as the known compounds 5-isopropyl resorcinol and phloroglucinol. In addition these hydroperoxides may be used for the synthesis of corresponding alcohols and alpha methyl styrene derivatives, the synthesis of corresponding acetyl phenol derivatives, for conversion to metal salts having soap-like properties, for components of explosive compositions (particularly the di- and trihydroperoxides), for oxidizing or bleaching operations, for polymerization catalysts, free radical reactions, etc.

The new compound, 3,5-diisopropyl phenol, forms new and useful phenolic resins when reacted with an aldehyde in acid or alkali medium. These resins have the unexpected property of being permanently fusible and soluble (in acetone or benzene) when heated, even in the presence of aldehyde in addition to that proportion initially used in preparing them, and form the subject matter of my copending application Serial No. 326,782, now U. S. Patent 2,732,368, filed on the same date as this application.

The compound, 5-isopropyl resorcinol, although somewhat less reactive than resorcin towards formaldehyde and alkali, may be used for producing by reaction with formaldehyde a liquid glue which cures at room temperature and is suitable as a plywood bonding agent.

The known compound, phloroglucinol, has a variety of uses such as described, for example, in "The Merck Index," Merck and Co., Inc., Rahway, N. J., 1952.

The following examples are for the purpose of illustrating the present invention and are not limiting to the scope thereof which is set forth in the appended claims.

EXAMPLE I

A mixture of 750.1 gm. of 1,3,5-triisopropyl benzene (freezing point −12.5 C.) and 0.75 gm. powdered caustic soda was placed in a glass flask and maintained at about 80° C. A steady stream of dry air was passed thru the liquid by means of a fritted glass bubbler. After traveling thru the liquid, the exit air was passed thru a condenser maintained at −80° C. to retain hydrocarbon carried along by the air stream. Samples of the liquid were removed periodically and titrated for hydroperoxide content by the method of Wagner, Smith and Peters (Ind. Eng. Chem. Anal., Ed. 19, 976 (1947). Results are summarized in Table I. In this table, as well as in all succeeding tables, the reported percent hydroperoxide value is that calculated for 1,3,5-triisopropyl benzene mono-hydroperoxide ($C_{15}H_{23}O_2H$) from titration results.

Table I

| Time (Hours) | Air Input Total (Cubic Feet) | Percent Hydroperoxide in Liquid |
|---|---|---|
| 20 | 0.9 | 4.3 |
| 44 | 6.2 | 14.5 |
| 68 | 11.7 | 29.2 |
| 100 | 17.8 | 43.7 |
| 171 | 26.2 | 58.0 |

The final yield of product was 811.3 gm.

A portion of the oxidized product was subjected to further oxidation at about 95° with the results shown in Table II.

Table II

| Time (Hours) | Percent Hydroperoxide in Liquid |
|---|---|
| 4 | 68.3 |
| 5½ | 70.4 |
| 12 | 96.4 |

When cooled the final product was a viscous liquid which deposited a white solid, presumably di- and tri-hydroperoxide, on standing.

EXAMPLE II

About 100 cc. of 1,3,5-triisopropyl benzene (freezing point −12° C.) was placed in a 250 round bottom flask. The bulb of the flask was immersed in a glycerine bath maintained at 95° C. A steady stream of dry carbon dioxide-free air was bubbled thru the liquid from a pencil-type fritted glass bubbler at a rate of about 0.3 cubic foot per hour. After passage thru the liquid the spent air was conducted thru a condenser maintained at −80° C. to retain hydrocarbon vapor. The percentage of hydroperoxide in the hydrocarbon was determined periodically with the results shown in the first and second columns of Table III. (See under Example III.)

EXAMPLE III

Another oxidation was carried out under the same conditions and on the same lot of hydrocarbon used in Example II except that there were added to the 100 cc. of hydrocarbon 5 cc. of previously oxidized hydrocarbon containing about 20% hydroperoxide plus 0.06 gm. of powdered caustic soda. The results of this catalyzed oxidation are shown in the third and fourth columns of Table III.

Table III

| 1,3,5-triisopropyl benzene alone | | 1,3,5-triisopropyl benzene with hydroperoxide and caustic soda | |
|---|---|---|---|
| Time, Hrs. | Percent Hydroperoxide | Time, Hrs. | Percent Hydroperoxide |
| Start | 0.0 | Start | 1.2 |
| 17 | 11.7 | 16.5 | 60.6 |
| 26 | 28.2 | 26 | 75.2 |
| 42.5 | 57.6 | | |

EXAMPLE IV

A series of metal naphthenates were compared as typical metal catalysts for hydroperoxide formation. The naphthenates were dissolved in 1,3,5-triisopropyl benzene (freeze point −12° C.) to give solutions containing 0.02–0.07% of dissolved metal. Equal quantities (0.85 gm.) of each solution and of the control 1,3,5-triisopropyl benzene were placed in glass-stoppered flasks of 250 ml. capacity and the flasks were heated in an oven for 16½ hrs. at 65° C. The flasks were then cooled and the hydroperoxide content of the product determined, with the results given in Table IV.

Table IV

| Catalyst Naphthenate | Catalyst Concentration, Percent Metal | Percent Hydroperoxide |
|---|---|---|
| None | | 1.3 |
| Pb | .07 | 7.4 |
| Mn | .02 | 35.6 |
| Co | .02 | 36.5 |
| Zn | .03 | 4.1 |
| Ca | .02 | 5.9 |
| Fe | .02 | 26.1 |

Similar results may be obtained with soaps, hydroperoxide salts or other derivatives soluble in 1,3,5-triisopropyl benzene and containing the following metals: Nickel, copper, cerium, thorium, vanadium, uranium, bismuth, barium, strontium, magnesium, potassium, lithium, rubidium, cesium, chromium, tin, molybdenum, antimony, and other metals.

Organic bases such as pyridine and tribenzylamine, which are soluble in 1,3,5-triisopropyl benzene, were also found to accelerate the conversion of 1,3,5-triisopropyl benzene to its hydroperoxides.

EXAMPLE V 1,3,5-triisopropyl benzene (freeze point −12° C.) was oxidized with air in a layer about 0.04 cm. thick on a pyrex glass surface heated to 200° C. The average hydroperoxide contents obtained in experiments run for varying periods of time are given in Table V.

Table V

| Time, Mins. | Percent Hydroperoxide in Oxidate |
|---|---|
| 1 | 0.6 |
| 5 | 3.2 |
| 10 | 6.1 |

EXAMPLE VI 1,3,5-triisopropyl benzene of freezing point −12° was oxidized by prolonged treatment with air at 15–30° to give a product containing 1.7% hydroperoxide. The monohydroperoxide of 1,3,5-triisopropyl benzene was isolated from the oxidate by a chromatographic process involving adsorption on activated alumina. The oxidate was slowly passed thru a column of activated alumina which absorbed the hydroperoxide. Benzene was then passed thru the column to remove 1,3,5-triisopropyl benzene, the hydroperoxide remaining in the alumina. The hydroperoxide was eluted from the column with ethyl alcohol and was recovered from its solution in the alcohol by distilling off the solvent in high vacuum. The monohydroperoxide was thus obtained as a viscous liquid having $n_d^{25}$ 1.5089 and $d_4^{25}$ 0.983, mono-hydroperoxide content (iodometric) 97.5%, molecular refraction 71.8 observed, 71.9 calculated; C, 76.41, 76.45%; H, 9.97, 9.88%; calculated for $C_{15}H_{24}O_2$ C 76.23%; H, 10.23%.

EXAMPLE VII 1,3,5-triisopropyl benzene was oxidized, using the method of Example 1, to a nominal mono-hydroperoxide content of 20.84%. 50.43 gm. of this material were distilled from a pot still without column in a vacuum of approximately 5 microns. After the unchanged hydrocarbon had been removed the mono-hydroperoxide came over as a colorless viscous oil at a temperature of about 100° C.

EXAMPLE VIII

Air was bubbled thru a mixture of 5414 gm. 1,3,5-triisopropyl benzene (freezing point −10° C.) and 5.4 gm. powdered caustic soda at 80–95° until titration indicated the presence of 84.7% hydroperoxide (calc. as the mono-hydroperoxide). The product on standing at 10° C. deposited a white solid which was filtered off and washed with cold toluene. The recovered solid amounted to 655 gm. and contained the di- and tri-hydroperoxides of 1,3,5-triisopropyl benzene.

These hydroperoxides were separated from each other by extracting the mixture with four times its weight of toluene at 60° C. The di-hydroperoxide of 1,3,5-triisopropyl benzene is soluble under these conditions and 415 gm. of this compound melting at 85–90° were obtained by chilling the toluene extract. The tri-hydroperoxide of 1,3,5-triisopropyl benzene remained undissolved and there were recovered 46.5 gm. of it with a melting point of 132–135° C.

For complete purification each compound was crystallized to constant melting point from ethyl acetate and acetone. The melting points and combustion analyses are given in Table VI.

Table VI

| | 1,3,5-triisopropyl benzene di-hydroperoxide (Melting point=94° C.) | | 1,3,5-triisopropyl benzene tri-hydroperoxide (Melting point=141° C.) | |
|---|---|---|---|---|
| | calc. | obs. | calc. | obs. |
| Percent C | 67.20 | 67.20–67.42 | 59.98 | 61.34–61.62 |
| Percent H | 8.99 | 8.91–8.74 | 8.05 | 7.68–7.39 |
| Percent O (by difference) | 23.81 | 23.89–23.84 | 31.87 | 30.98–30.99 |

EXAMPLE IX

A mixture of 1550 gm. of 1,3,5-triisopropyl benzene hydroperoxide and about 617 gm. 1,3,5-triisopropyl benzene was placed in a three neck flask provided with an agitator, dropping funnel and outlet to a condenser and chilled receiver. The mixture was maintained at 50–60° C. and to it was added over a three hour period a solution of 23 gm. toluene sulfonic acid in 150 gm. 1,3,5-triisopropyl benzene. After further reacting ½ hour at 50–60° the mixture contained less than 0.3% hydroperoxide. The bulk of the acetone was removed from the solution by simple distillation, the remainder being recovered by adding about 45 gm. water to the reactor and continuing distillation. Total acetone recovery was 296 gm., 77% of theory.

The remaining solution was mixed with a solution of 400 gm. potassium hydroxide in 500 gm. water and steam distilled to recover the 1,3,5-triisopropyl benzene. The alkaline solution was neutralized, ether extracted, and the resulting 3,5-diisopropyl phenol (596 gm. or 51% of theory) was recovered by distillation. The 3,5-diisopropyl phenol so recovered had a freezing point of 47°. By fractional distillation of the crude 3,5-diisopropyl phenol in vacuum a product was obtained having a freezing point of 52.4° C. For further characterization the 3,5-diisopropyl phenol was converted to the corresponding phosphate by reaction with phosphorus oxychloride. The phosphate had a boiling point of 271–273° at about 0.8 mm., froze at 67.1° and contained C, 74.72%; H, 8.82%; P 5.36%; calc. for $C_{36}H_{51}O_4P$; C, 74.70%; H, 8.88%; P, 5.37%.

EXAMPLE X 38.6 gm. of 1,3,5-triisopropyl benzene di-hydroperoxide obtained as described in Example VII, having a melting point of 94° C. was dissolved in 150 cc. of toluene at 55° C. The solution was added from a separatory funnel in the course of about 30 minutes to 10 cc. toluene and 0.77 gm. toluene sulfonic acid contained in a three neck flask. The flask was provided with an agitator and an outlet to a condenser and a receiver. The contents of the reactor were maintained at 60–70° C. during the addition and for 15 minutes thereafter, at the end of which time test showed practical absence of hydroperoxide.

The contents of the flask were then mixed with 150 cc. of water and distilled until 270 gm. of distillate were collected. The distillate contained 13.4 gm. acetone (80% of theory) as determined by the hydroxylamine hydrochloride method.

The undistilled residue was mixed with ether and the ether layer was separated and extracted with caustic. The caustic layer was acidified and extracted with ether. The resulting extract after evaporation of the ether was distilled in vacuum to give 17.5 gm. (80% of theory) of crude 5-isopropyl resorcinol boiling at about 220–240° under 80–90 mm. pressure and melting at 106° C.

For more complete purification the 5-isopropyl resorcin was redistilled and crystallized from benzene to constant melting point. The pure substance was colorless and melted at 111°, combustion analysis showed C 72.86, 73.00%; H 8.05; 8.12%; calc. C 71.02%; H 7.95%.

EXAMPLE XI 10 gm. of 1,3,5-triisopropyl benzene tri-hydroperoxide obtained according to Example VIII and having a melting point of about 140° C. were mixed with 105 gm. of glacial acetic acid contained in a 3 neck flask provided with a dropping funnel, agitator and reflux condenser. The charge was adjusted to about 20° C. and agitated continuously. To it was slowly added from the dropping funnel over a period of about 10 minutes a mixture of 2 cc. 60% perchloric acid and 6 cc. glacial acetic acid. After addition of the perchloric acid solution the temperature rose rapidly, and was held in the range 40–70° with external cooling for about 15 minutes at the end of which time titration indicated disappearance of the hydroperoxide.

A 6.4 gm. sample of product was removed from the reactor and found to contain 0.154 gm. acetone which is equivalent to a total yield of 3 gm. of acetone (52% of theory).

The remaining product was diluted with water and extracted with ether. The extract after removal of ether was distilled in vacuum to remove acetic acid and water leaving the phloroglucinol as a brown solid residue, yield 3.0 gm. or 72% of theory. Crystallization of the crude phloroglucinol from boiling water gave a product melting at 220°. It was identified by mixed melting point with authentic phloroglucinol. The crude phloroglucinol was also converted to the benzoate which melted at 173° alone and in mixture with authentic phloroglucinol benzoate.

EXAMPLE XII

An oxidation product similar to that described in Example VIII and containing mono-, di-, and tri-hydroperoxides of 1,3,5-triisopropyl benzene was treated with toluene sulfonic acid as described in Example IX. The phenol fraction was recovered from the potassium hydroxide solution as described in Example IX. Fractional distillation of the phenol fraction yielded 3,5-diisopropyl phenol of freezing point 51.1°, and small quantities of higher boiling fractions which gave tests for 5-isopropyl resorcinol and phloroglucinol.

I claim:
1. 3,5-diisopropyl phenol.
2. A process for the production of 3,5-diisopropyl phenol and acetone which comprises catalytically decomposing 1,3,5-triisopropyl benzene and monohydroperoxide in the presence of an acid.

References Cited in the file of this patent

UNITED STATES PATENTS

| | | |
|---|---|---|
| Re. 23,916 | Lorand et al. | Dec. 28, 1954 |
| 2,514,419 | Schulze et al. | July 11, 1950 |
| 2,544,818 | Axe | Mar. 13, 1951 |
| 2,548,435 | Lorand et al. | Apr. 10, 1951 |
| 2,573,947 | Bell et al. | Nov. 6, 1951 |
| 2,626,281 | Joris | Jan. 20, 1953 |
| 2,628,984 | Aller et al. | Feb. 17, 1953 |
| 2,664,447 | Lorand et al. | Dec. 29, 1953 |

FOREIGN PATENTS

| | | |
|---|---|---|
| 598,988 | Great Britain | Mar. 2, 1948 |
| 968,209 | France | Apr. 12, 1950 |
| 485,435 | Canada | Aug. 5, 1950 |
| 986,292 | France | July 30, 1951 |
| 503,546 | Belgium | June 15, 1952 |

OTHER REFERENCES

Berry et al.: Journal Amer. Chem. Soc., vol. 49, December 1927, pp. 3142–3149.

Meyer et al.: Chem. Abstracts, vol. 24, pp. 346–7 (2 pp.) (1930).

Sowa et al.: Jour. Amer. Chem. Soc., vol. 55 (1933) pp. 3402–3 (2 pp.; entire article pp. 3402–7).

UNITED STATES PATENT OFFICE
CERTIFICATE OF CORRECTION

Patent No. 2,790,010                                                            April 23, 1957

Alvin F. Shepard

It is hereby certified that error appears in the printed specification of the above numbered patent requiring correction and that the said Letters Patent should read as corrected below.

Column 10, line 36, claim 2, strike out "and".

Signed and sealed this 8th day of April 1958.

(SEAL)
Attest:

KARL H. AXLINE
Attesting Officer

ROBERT C. WATSON
Commissioner of Patents